United States Patent [19]
Metherell

[11] 3,919,881
[45] Nov. 18, 1975

[54] TEMPORAL REFERENCE WAVEFRONT RECONSTRUCTION PROCESS AND SYSTEM

[75] Inventor: Alexander F. Metherell, Newport Beach, Calif.

[73] Assignee: McDonnell Douglas Corporation, Long Beach, Calif.

[22] Filed: Dec. 27, 1971

[21] Appl. No.: 212,765

Related U.S. Application Data

[63] Continuation of Ser. No. 852,715, Aug. 25, 1969, abandoned.

[52] U.S. Cl. .............. 73/67.5 H; 73/71.3; 340/5 H; 350/3.5
[51] Int. Cl. ......................... G01n 29/04; G01b 9/00
[58] Field of Search ........ 73/67.5 H, 71.3; 340/5 H; 350/3.5; 181/.5

[56] References Cited
UNITED STATES PATENTS

| | | | |
|---|---|---|---|
| 3,434,339 | 3/1969 | Stetson et al. | 73/71.3 |
| 3,494,698 | 10/1970 | Neumann | 356/106 |
| 3,509,761 | 5/1970 | Stetson | 73/67.5 H |
| 3,600,935 | 8/1971 | Baum | 73/67.5 H |

FOREIGN PATENTS OR APPLICATIONS

| | | | |
|---|---|---|---|
| 1,479,712 | 3/1967 | France | 73/67.5 H |

OTHER PUBLICATIONS

Gabor et al, "Interference Microscope w/total Wavefront Construction," Jour. Op. Soc. Am., July, 1966, pp. 849–858.

Neumann et al, "Improvement of Recorded Holographic Fringes . . . Applied Optics, June, 1967, p. 1097–1104.

Abstract TUC16, Holographic Technique for Determining the Phase of Vibrating Objects, Neumann et al., J.O.S.A., Apr. 1969 pp. 474, 73–713.

C. C. Aleksoff, Time Average Holography Extended, Applied Physics Letters, Jan. 1, 1969, pp. 23 & 24, 73–71.3.

Primary Examiner—Richard C. Queisser
Assistant Examiner—John P. Beauchamp
Attorney, Agent, or Firm—Max Geldin

[57] ABSTRACT

An improved process and method of wavefront reconstruction is disclosed in which one of the reference and object illuminating beams is shifted in phase relative to the other for a subsequent illumination. When applied to acoustical holography, the phase shift is $\lambda/4$ at a time relative to the acoustical frequency that is ½ cycle later. In other applications, the phase shift may be limited to $0.1\lambda$ and can modulate a one of the beams at the acoustical frequency. Temporal reference holography also is disclosed in which a hologram is created without the use of a reference beam.

60 Claims, 12 Drawing Figures

INVENTOR:
Alexander F. Metherell
ATTORNEY

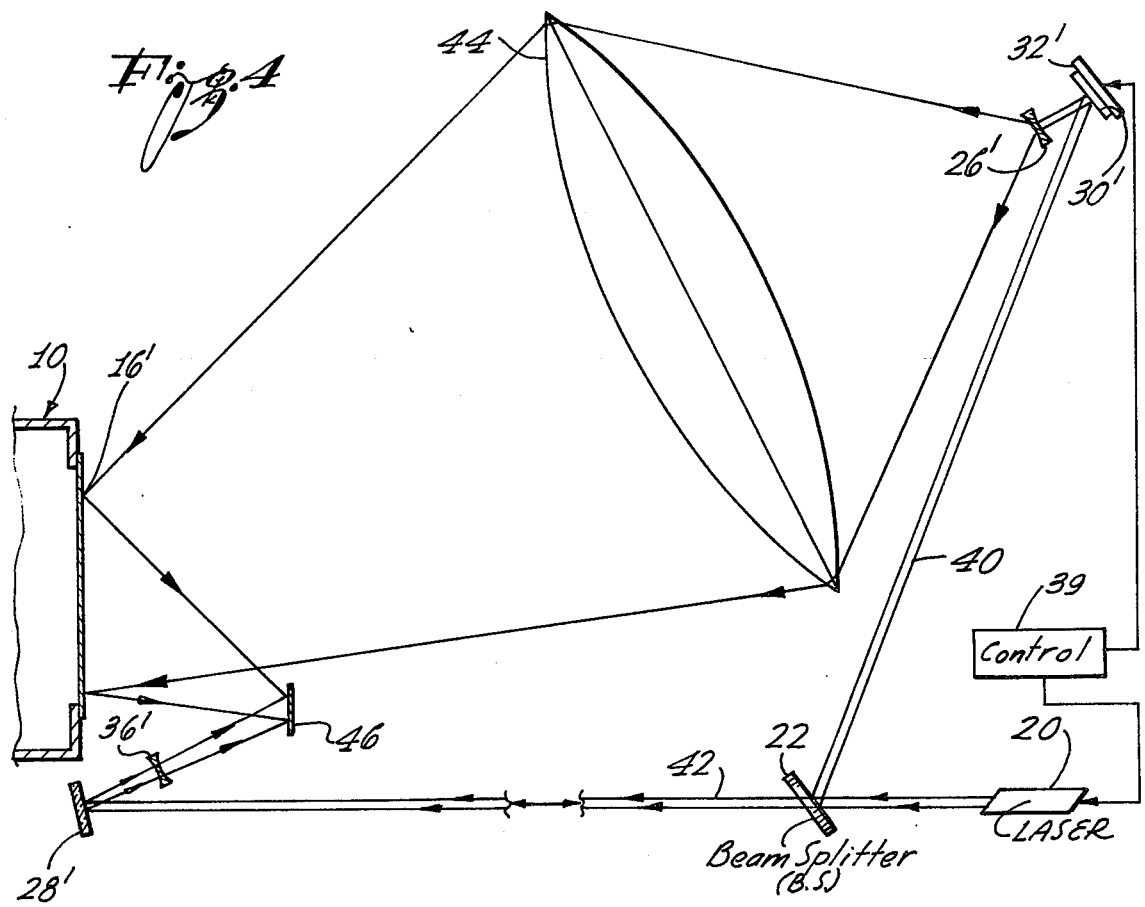
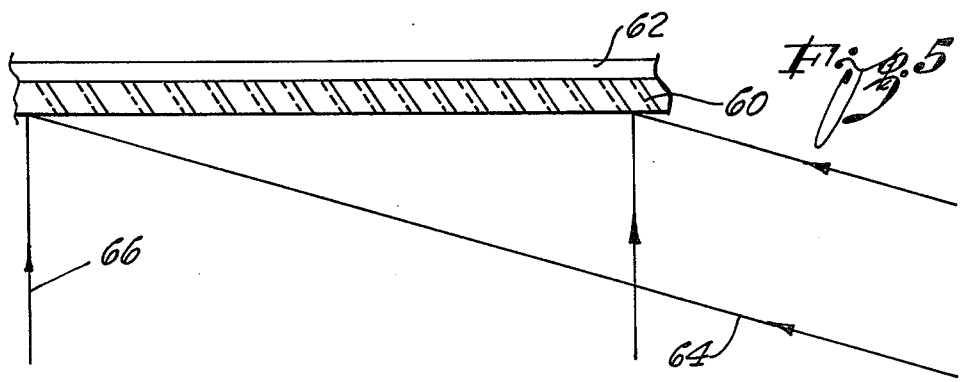
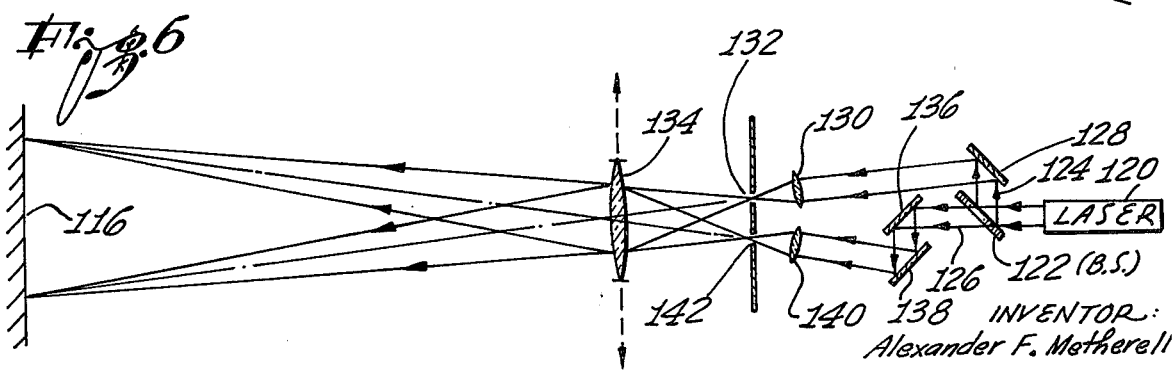

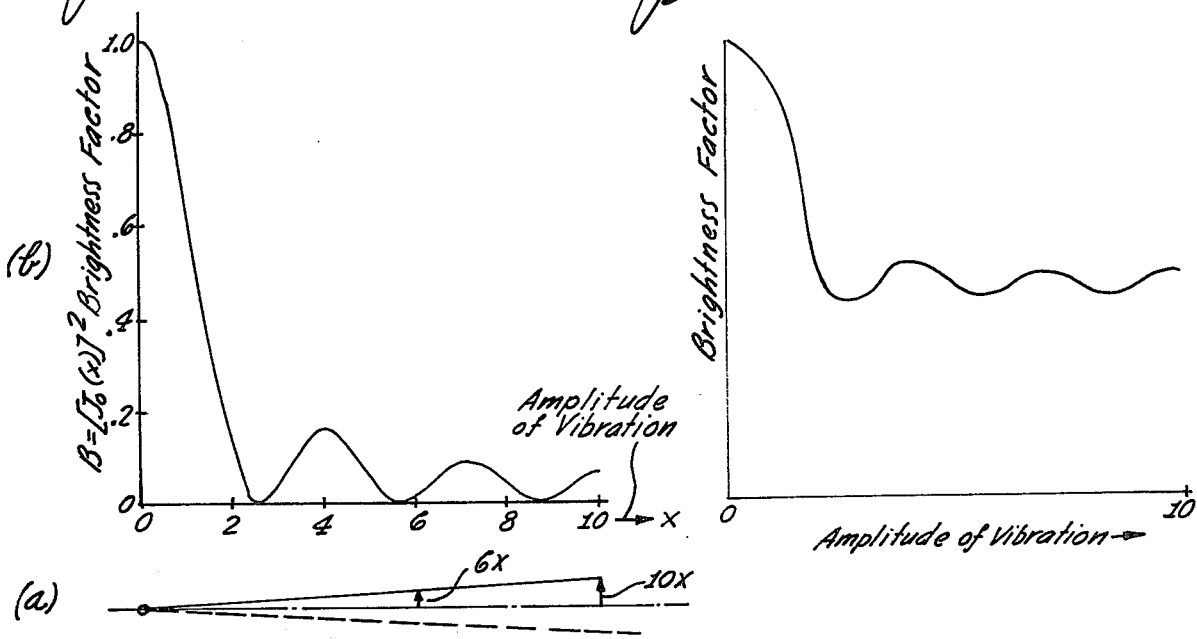
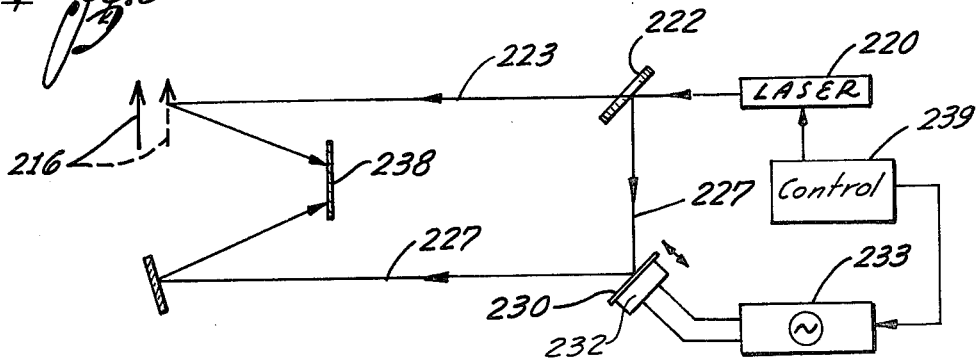
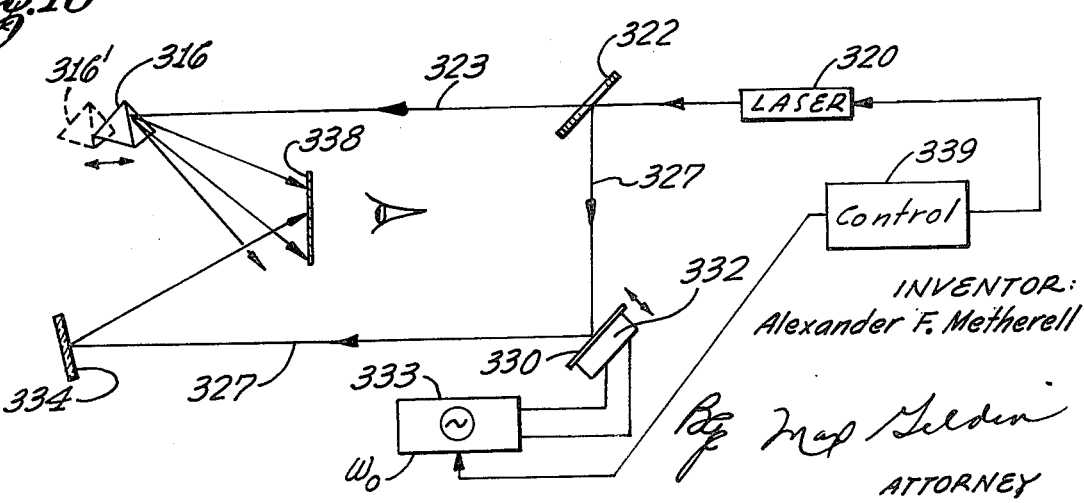

TEMPORAL REFERENCE WAVEFRONT RECONSTRUCTION PROCESS AND SYSTEM

This is a continuation of U.S. application Ser. No. 852,715, filed Aug. 25, 1969, now abandoned.

The present invention relates to holography and, more particularly to apparatus and methods for producing interferometric holograms acoustical holograms or sonoholograms.

Prior art researchers have, with some detail, described apparatus and methods for producing "sonoholograms" or sound holograms. In the Journal of Photographic Science, Vol. 14, 1966, at Page 329, P. Greguss, in an article entitled "Techniques and Information Content of Sonoholograms", described a method using photographic plates which were sensitive to ultrasonic waves, in order to produce what Greguss termed a "sonohologram".

Utilizing what are now considered conventional techniques, Greguss obtained a photographic diffraction pattern of an object using "monochromatic" coherent, ultrasonic radiation on an object by combining an "illuminating" wave and a "reference" wave, derived therefrom. The resulting interference pattern then exposed the film which, when developed, provided a hologram which could be used to reconstruct an image of the object.

Almost simultaneously, R. K. Mueller and N. K. Sheridon published an article entitled "Sound Holograms and Optical Reconstruction" at Page 328 of Vol. 9, of Applied Physics Letters, dated on November, 1966. The Mueller and Sheridon article described a hologram which was made of an object immersed in water and illuminated by ultra sound. The deformation of the water surface by radiation pressure produced a ripple pattern which had the characteristics of a hologram. As in conventional laser holography, an ultra sonic illuminating beam and a reference beam were combined and formed an interference pattern at the water surface. By simply photographing the deformed water surface, an image was obtained in which the capacity was roughly proportional to the sound intensity at the corresponding point of the water surface. That image served as a hologram to obtain an optical reconstruction of the acoustically illuminated object.

The basic principles of laser photography have been generally set forth in an article published in the Scientific American of June, 1965, Vol. 212, No. 6 by Emmett N. Leith and Juris Upatnieks, entitled "Photography by Laser". That article described, in some detail, the photographic technique sometimes referred to as photography by wave-front reconstruction. This process records, not an image of an object, but rather the light waves reflected from the object. The records must necessarily contain information representing amplitude of the illuminating radiation and phase information as well.

Recording the amplitude portion poses no serious problem since ordinary photographic film responds to amplitude and the opacity of the developed film is a function of amplitude. However, the emulsion is relatively insensitive to phase information and accordingly a reference beam is generally necessary to create an interference pattern which, in the absence of object motion, is static, effectively "freezing" the phase relationships.

In optical holography, therefore, except for the special instance of "time averaged holography", the interference or standing wave pattern must remain for a finite number of cycles of the illuminating wave (which is being recorded) in order to adequately expose the photographic emulsion. However, if a hologram is being made of an object which has been illuminated by acoustical waves, and somehow these acoustical waves can be made "visible", then a hologram of the acoustical wave front can be made during a portion of a cycle of a acoustical wave.

As noted in the Mueller and Sheridon article, above, illumination of an immersed object by sound waves creates a pressure pattern on the water surface against the restoring forces of gravity and surface tension to form a ripple pattern. The ripple pattern will change at the illuminating frequency unless a reference sound wave is provided to form a relatively static interference pattern.

A recent paper by the inventor herein, published in Applied Physics Letters, Vol. 13, No. 10, dated Nov. 15, 1968, entitled "Temporal Reference Holography" suggested the creation of holograms without the use of a "reference" beam to create "standing waves". At the Second International Symposium on Acoustical Holography at Huntington Beach, California, on Mar. 6, 1969, the inventor, together with S. Spinak and E. J. Pisa, presented a paper entitled, "Temporal Reference Acoustical Holography", published by the Douglas Advanced Research Laboratories as Research Communication 103, which explored this area in greater detail.

According to a preferred embodiment of the present invention, a "deformable" surface is photographed using 5% of an acoustical cycle, which may be considered substantially instantaneous with respect the sonic wave. The process may be deemed "linear detection" which preserves both amplitude and phase relationships of the sonic wave. A later hologram is made one-half an acoustical cycle later, resulting in a doubly exposed photographic plate. However, between the two exposures, the optical path of either the optical reference beam or the optical object beam is changed by one quarter of an optical wave length which introduces a 90° phase shift as between two beams.

The optical hologram thus recorded is a holographic inerferometer record of the displacement of the surface between the two exposures. Since the two exposures are taken half an acoustical cycle apart, a positive displacement in the first exposure becomes a negative displacement in the second exposure, thus doubling the displacement measured and increasing the sensitivity of the system.

Since the displacements are about the "quarter-wave length position" the intensity of the interference pattern is positive for positive displacements, as a function of the direction of the one quarter wave shift. By adding the quarter wave shift into the second image, the slope of the interference curve about the quarter wave length point, is virtually linear, and intensity is then closely related to displacement amplitude.

For best results, the displacement amplitudes (crest to trough) of the surface should be less than ¼ of an optical wave length, when recording the surface with reflected light since the interference curve reaches either a maximum or minimum displacement at this amplitude. However, to maintain the linear relationship as between amplitude and intensity, the crest to trough amplitudes should probably be less than 1/16 of an optical wave length.

The optical reconstruction of the acoustically deformed surface from the interferometric hologram will depict the surface with varying optical intensities from point to point, which correspond to the displacement and is the equivalent of an acoustical hologram. The image can be photographed and subsequently be used to reconstruct the acoustical hologram using conventional wave front reconstruction techniques. In the case wherein the line from the optical hologram to the acoustical hologram is perpendicular to the plane of the acoustical hologram, the reconstructed acoustical image will appear beyond the image of the acoustical hologram, since the optical hologram is a hologram of the acoustical hologram.

In an alternative embodiment, the pulsed laser is replaced by a continuous wave (cw) laser. In this embodiment, the acoustically deformed surface is scanned by a beam of light in some regular fashion, but at a scan velocity which is sufficiently high so that any point on the acoustic plane is illuminated for much less than one acoustic cycle. For a complete interferometric hologram, a second beam of light sweeps the plane, ½ of an acoustic cycle behind the first beam so that the doubled amplitude of acoustic displacement can be recorded. Further, the second scanning beam has the one-quarter optical wave length change included in it.

The resulting hologram may then be used substantially identically to the one produced with the pulsed laser. It may be noted that the two techniques have counterparts in conventional photography when one considers the relative advantages and disadvantages of the "iris" or "guillotine" shutter as opposed to the "roller curtain" or "focal plane" shutter. In other alternative embodiments, it is desired to observe and measure displacements of magnitudes that are substantially less than ¼ the wave length $\lambda$ of the optical illuminating beam, and which may be more on the order $\lambda/10$. These embodiments are more useful in interferometric holography where the prior art methods have utilized a time exposure of a vibrating object or have superimposed a holographically reconstructed image upon a vibrating object. They are also useful for measuring very small changes in phase that may result from the transmission of light through a medium such as glass under periodic stress.

Both prior art methods enabled a measure of the amplitude of vibration through an analysis of the "interference fringes" produced by the plural images. In the one case, the vibrating object is reconstructed with "fringes" and the amplitude of vibration corresponds to the number of fringes recorded, each fringe representing one wave length.

According to the present invention; Amplitudes that are less than one wave length and preferably less that $\lambda/10$ can be represented as a function of "brightness" of the image. Rather than using the "instantaneous holography" technique of the preferred embodiments, either a plurality of exposures are combined, or, a relatively long exposure is made. As with the preferred embodiment, a phase difference as between the object and reference beams is introduced.

In a first application, the Powell-Stetson methods, described in the several articles in the J. Opt. Soc. Am, Vol. 55 (12) : 1593–1598 and 1694–1695, (1965), and Vol. 56 (9) : 1161–1166 (1966), are modified by phase modulating a one of the beams by a predetermined magnitude $\phi$ at the object vibration frequency. The phase modulation has the effect of introducing an apparent uniform reciprocating motion to the object with a predetermined maximum amplitude. The brightness of the image can be considered in terms of zero order Bessel function in the form:

$$B = \left\{ J_o \left[ 4\pi m \frac{(x,y)}{\lambda} \right] \right\}^2 \quad (1)$$

The surface vibration is defined:
$\Delta = m\ (x,y) \cos [\omega_r t + \mu(x,y)]$ (2)
where:
$m$ = amplitude at a point $(x, y)$;
$\omega_r$ = vibration frequency; and
$\mu$ = phase of vibration at point $(x,y)$ Examining equation (1) it will be noted that the phase term, $\mu\ (x,y)$, does not enter into the brightness equation. However, when one of the optical beams is phase modulated at the $\omega_r$ frequency by a phase difference of $\phi$, the effective vibration is:

$$\Delta' = \frac{\phi}{2\pi} \cos \omega_r t + m(x,y) \cos [\omega_r t + \mu(x,y)] \quad (3)$$

$$\Delta' = M(x,y) \cos [\omega_r t + \Theta\ (x,y)] \quad (4)$$

$$M(x,y) = \left\{ [m(x,y) \sin \mu(x,y)]^2 + \left[\frac{\phi}{2\pi} + m(x,y) \cos \mu(x,y)\right]^2 \right\}^{\frac{1}{2}} = \left\{ m^2 + \left(\frac{\phi}{2\pi}\right)^2 + \frac{\phi m}{\pi} \cos \mu \right\}^{\frac{1}{2}} \quad (5)$$

$$\Theta\ (x,y) = \tan^{-1} \left\{ \frac{m \sin \mu}{\frac{\phi}{2\pi} + m \cos \mu} \right\} \quad (6)$$

By reconstructing an image from the time averaged holograms, the intensity of the image is proportional to $$B = \left\{ J_o \left[ \frac{4\pi M(x,y)}{\lambda} \right] \right\}^2 \quad (7)$$

which includes a contribution from the phase term $\mu(x,y)$. Under appropriate conditions, Eq. (7) may be considered a linear recording of the function $M(x,y)$, given in Eq. (5).

The recording itself is in the form
$$A_o^2 + A_r^2 + 2A_oA_r \cos \mu \quad (8)$$

This would then be analogous to an object wave term of phase $\mu$ and amplitude
$A_o = m$ where $A_o$ is the amplitude of the "object" wave; and a "reference" wave term with
$A_r = \phi/2\pi$,
where $A_r$ is the amplitude of the "reference" wave of phase O.

The second application would be directed to the hologram of a stationary object, which is later to be reconstructed and superimposed upon the same object in a vibrating state at a predetermined frequency. However, the reconstructing radiation is phase modulated at the predetermined frequency of vibration to create a virtual vibration of the image of a limited amplitude which is superimposed upon the actual vibrating object. The brightness of the image observed in real time, and which can be photographed will also be a zero order Bessel function in which brightness is directly proportioned to amplitude of vibration.

The novel features which are believed to be characteristic of the invention, both as to organization and method of operation, together with further objects and advantages thereof will be better understood from the following description considered in connection with the accompanying drawings in which several preferred embodiments of the invention are illustrated by way of example. It is to be expressly understood, however, that the drawings are for the purpose of illustration and description only and are not intended as a definition of the limits of the invention.

FIG. 4 is a diagram of an alternative arrangement for generating and recording an optical interferometric hologram of an instantaneous acoustical hologram;

FIG. 5 is a diagram of yet another embodiment of the system of the present invention in which the photographic emulsion is the acoustically deformed plane;

FIG. 6 is yet another method of producing an interferometric hologram of an acoustical hologram utilizing a "scanning" technique and a continuous wave laser;

FIG. 7 including FIGS. 7a and 7b is a graph of brightness against displacement amplitude obtained using the Powell and Stetson time averaged recording method;

FIG. 8 is a graph of brightness against displacement amplitude when viewing the object vibrating in real time where the viewer's eye visually time averages to give this resulting intensity pattern;

FIG. 9 is a diagram of a system for providing Powell-Stetson hologram modified by phase modulating one of the laser beams;

FIG. 10 is a diagram of a real time system for viewing a vibrating object with a reconstructed image of the same object superimposed thereon.

Figure 11:
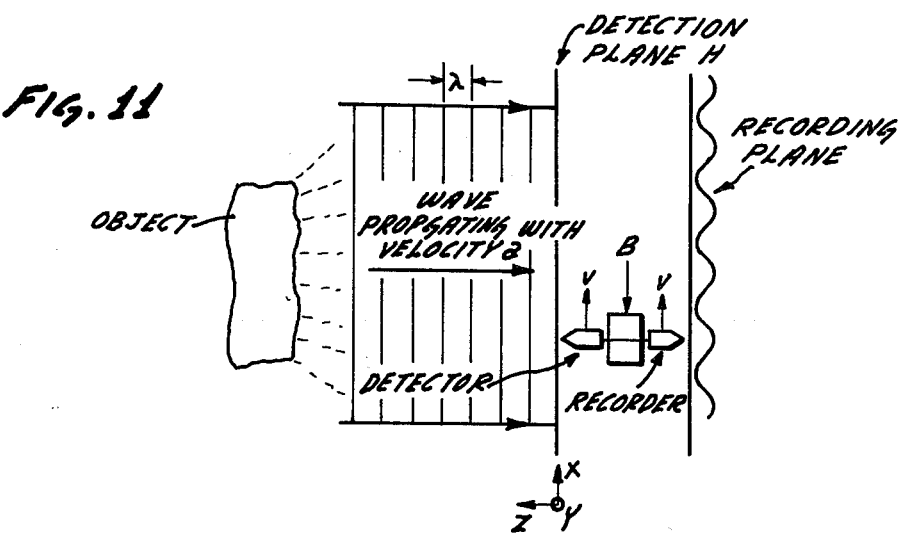

FIG. 11 is a system for recording a temporal reference hologram; and

Figure 12:
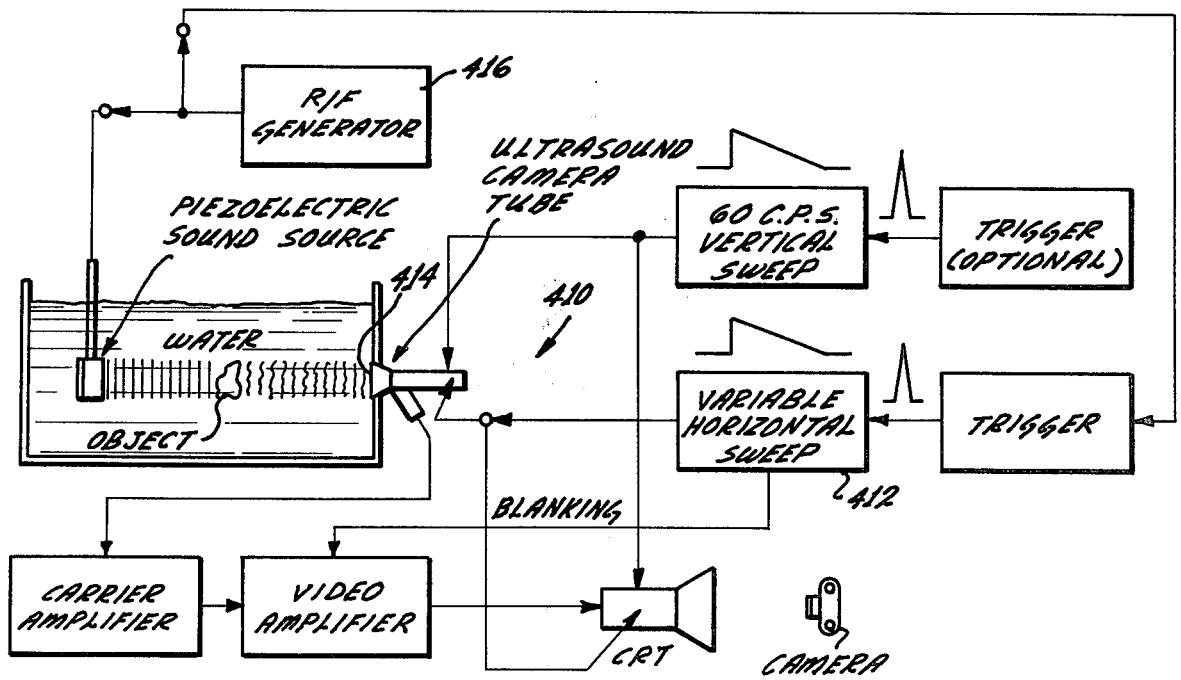

FIG. 12 is an ultrasonic camera system for creating temporal reference holograms.

Figure 1:
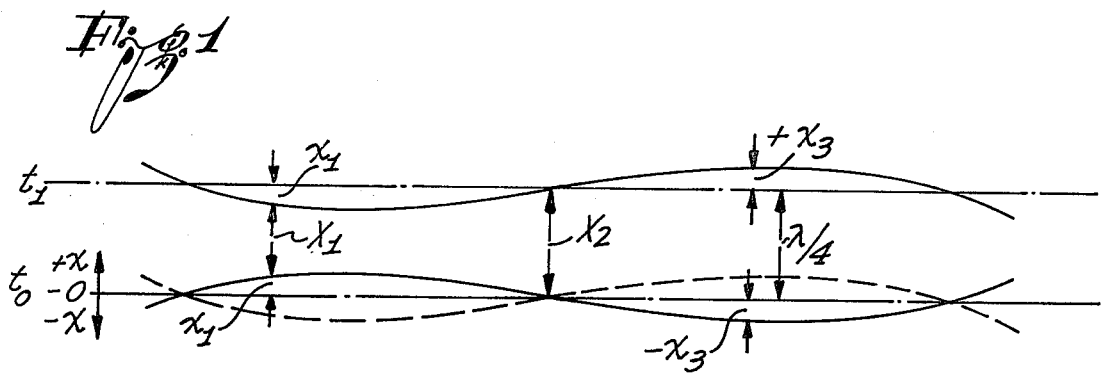
FIG. 1 is a graph of the relative positions of the two reconstructed images of an acoustically deformed surface.

Turning first to FIG. 1, there is indicated, in graphic form, the relative positions of the two reconstructed surfaces resulting from a doubly exposed hologram. A one-quarter optical wave length phase shift has been introduced in one of the optical beams during an exposure that is one-half of an acoustical cycle different from the first exposure.

As noted in the graph, assuming that an initial exposure is taken at time $t$, the surface might exhibit a relative displacement about a median surface position, as indicated by the "0" with a $+x$ or $-x$ displacement from that mean position.

A first portion of the surface may be displaced by a quantity $+x_1$ in the vertical direction, a second portion of the surface, at $X_2$, is at a "cross point", and a third portion of the surface is displaced in the negative direction by a quantity $-x_3$. At one-half of an acoustical cycle later, the datum line has been shifted, optically, by one-fourth of an optical wave length resulting from the $\lambda/4$ change in phase of one of the beams relative to the other. At time $t_1$, the surface has undergone displacements in directions opposite from the first exposure. The first portion of the surface is now displaced by an amount $-x_1$, the $X_2$ point still passes through the datum line and the third portion of the surface is now displaced in a positive direction by an amount $+x_3$.

Figure 2:
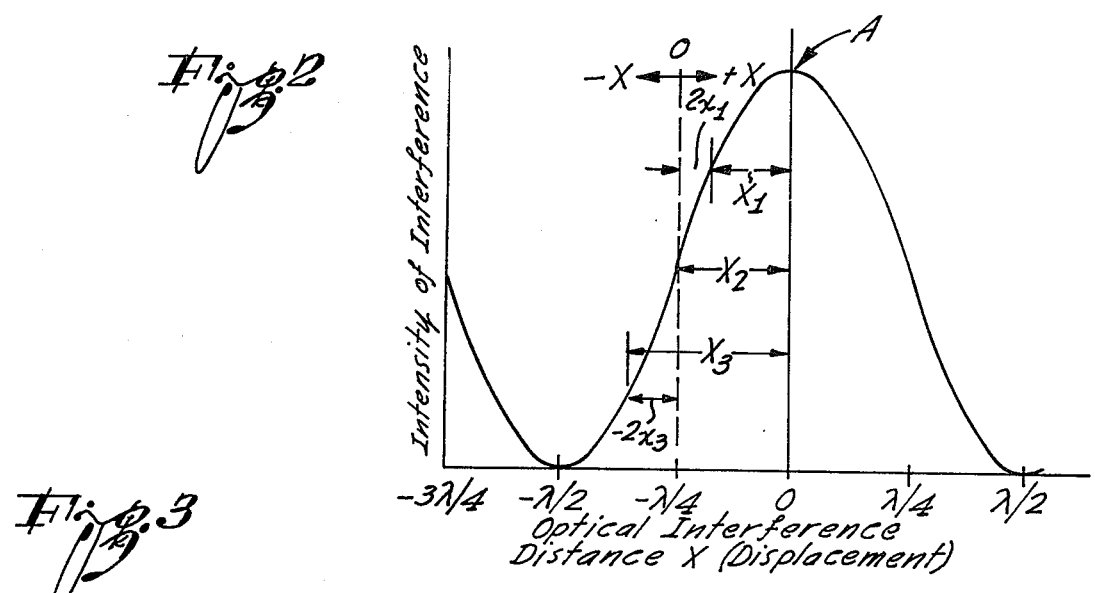
FIG. 2 is a graph of intensity of interference as a function of surface displacement.

Turning next to FIG. 2 there is shown a graph representing an interference pattern as between the two reconstructed wave fronts. Intensity of the resulting interference pattern is represented by displacement along the Y axis and the optical interference distance being indicated along the X axis. Because the intensity representing displacements are about the one-quarter wave length position, the pattern is "brighter" for positive displacement of the surface and "darker" for negative displacements of the surface. This, of course, is a function of whether or not the one-quarter wave shift results in a beam that is "longer" by one-fourth wave length or is "shorter" by one-fourth wave length.

With the quarter-wave position being the one of interest, even slight displacements will be recorded, since the slope of the interference curve is almost linear at that point. Most recording devices require a minimum threshold before recording inasmuch as the slope of the curve at the $X = 0$ and $X = \pm \lambda/2$ positions, is zero. Very small displacements produce little or no change in brightness. Further, interference intensity decreases for both positive and negative displacements when working about the $X = 0$ position. At the $\lambda/2$ point intensity increases for both positive and negative displacements.

To maintain the greatest sensitivity, the displacement amplitude of the surface should be less than 1/8 of an optical wave length, (crest to trough) when holographically recording the surface with reflected light. At this amplitude, the interference pattern approaches a relative maximum or minimum since the apparent displacement is effectively doubled by the photographic process. Greater displacements would tend to reach the "non-linear" portions of the curve and therefore surface displacements would no longer be linearly related to relative "brightness" or "darkness".

The optical reconstruction of the vibrating surface such as an acoustic detention surface, created from the interferometric hologram recorded in this manner will show the surface with varying brightness from point to point. The brightness corresponds linearly to the acoustic displacement. The reconstructed image of the surface may then be considered the acoustical hologram which can be photographed by focusing the surface onto yet another photographic film which, when developed, can reconstruct the "acoustical hologram".

If the line from the optical hologram to the acoustical hologram (the deformed surface) is perpendicular to the plane of the acoustical hologram and in line with the equivalent acoustical reference beam, the reconstructed acoustical image will appear beyond the image of the acoustical hologram. In such a case, the intermediate recording step can be eliminated.

Figure 3:
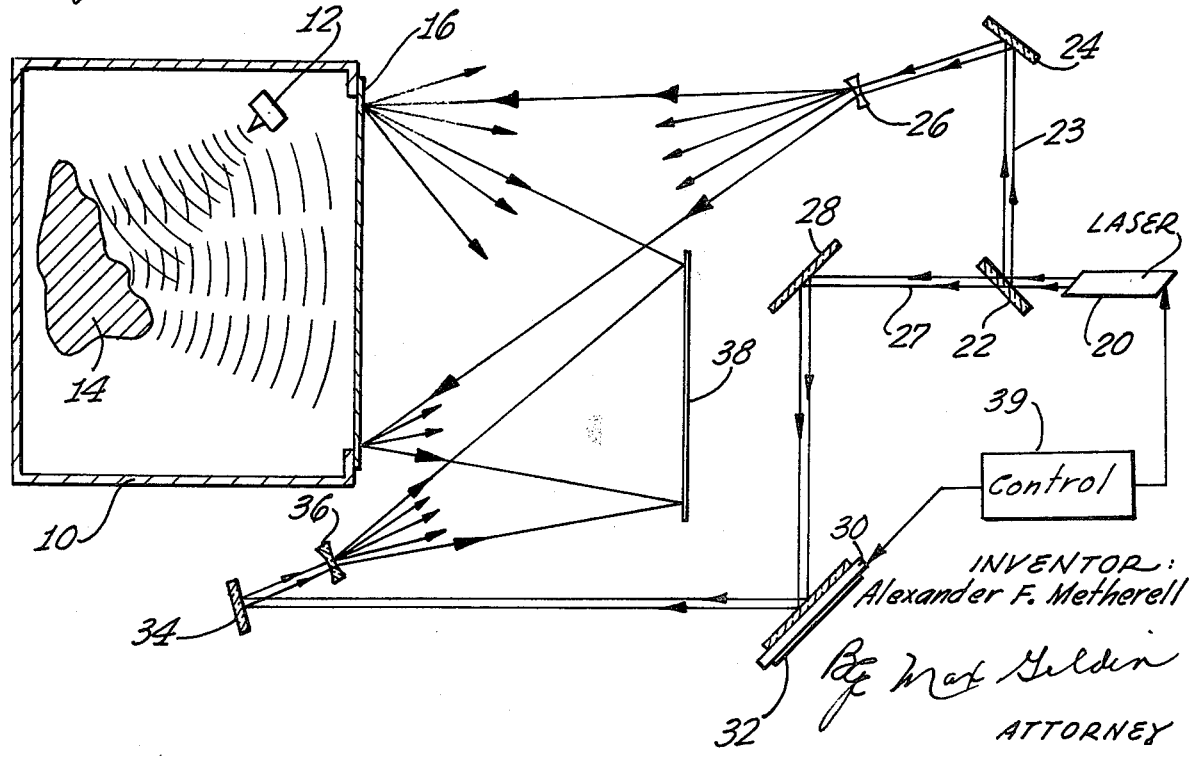
FIG. 3 is a diagram of an arrangement for instantaneously recording an optical interferometric hologram of an acoustical hologram using a pulsed laser.

Turning next to FIG. 3, there is shown in diagramatic form, one arrangement which can produce an interferometric hologram. A tank 10 is filled with a liquid. A sonic generator 12 "illuminates" an object 14, acoustically. The acoustical waves reflecting from the object 14 impinge upon a deformable surface 16, which is diffusely reflecting. As in the Mueller and Sheridon article, the surface 16 can be a thin plate, which is deformable by the acoustical waves and which is transparent to acoustical waves. A plate of Plexiglas (methyl methacrylate) is suitable. The surface can function as a linear detector of the acoustical radiation.

A pulsed laser 20 is a source of coherent, monochromatic radiation which produces a photographic image of the acoustically deformed surface 16. The laser beam directed at a beam splitter 22, which reflects the object part of the beam 23 to a first mirror 24. The object beam 23 is directed through a diverging lens 26 onto the surface 16.

The beam splitter 22 transmits the reference part 27 of the original beam to a second mirror surface 28. The reference beam proceeds to a third, movable mirror 30. The movable mirror 30 in this example is mounted upon a piezo electric material 32 or "motor element" which can be deformed by application of an electrical impulse, shifting the mirror in the preferred embodiment, by an amount which changes the optical path length by ¼ of an optical wave length. The mirror is displaced in a direction parallel to the perpendicular bisector of the angle included by the impinging and reflected beam. The resultant change in optical path length introduces the desired phase difference as between the object and reference beams.

The reference beam 27 is directed to yet another mirror 34 which directs the light to a second diverging lens 36. The reference beam 27 illuminates a photographic film 38 and "interferes" with the object beam 23 which is reflected from the acoustically deformed surface 16. A control circuit 39 pulses the laser 20 and energizes the motor element 32.

In operation, a first pulse is applied to trigger the laser 20 by the control circuit 39 to send a light beam through the beam splitter 22. The object beam 23 and the reference beam 27 are combined at the photographic film 38 which then contains a first hologram of the acoustically deformed surface 16. The laser radiation pulse is brief relative to an acoustical cycle and may, in a typical system, be a 25 nanosecond pulse. At a sonic frequency of 1 MHz, this would be a 1/40 of an acoustic cycle. Accordingly, the photograph of the surface preserves amplitude and phase relationships.

One-half an acoustical cycle later, the piezo electric motor 32 is energized by the control circuit 39, moving the mirror 30, and the laser 20 is again pulsed. The beam traversing the reference path travels a distance which differs by a one-fourth of an optical wave length from that of the prior exposure. A second image of the acoustically deformed surface 16, one-half cycle later, is superimposed on the photographic image previously recorded. The two exposures result in an interferometric hologram. Each exposure is, in effect, an instantaneous repesentation of the surface at the time of exposure, preserving amplitude and phase information.

Upon development of the film 38, the resulting hologram can be used to reconstruct the image of the surface 16. A photographic film placed at an appropriate point makes a holographic record of the acoustically deformed surface. Upon development, the second film now may be used for the wave front reconstruction of the object 14. It is noted that only a single sonic source 12 is utilized without a reference acoustical beam.

In order embodiments, objects to be holographically reconstructed may be embedded or encapsulated in a solid. An acoustical source may be coupled to one face and the opposite face can be the acoustically deformable surface which is made suitably reflective. If the solid material surrounding the object is transparent to sonic but not optical waver, then the holographic method may be the only one available to visualize the object.

Turning next to FIG. 4, there is shown an alternative embodiment of the present invention, which permits a more efficient utilization of the available, optical energy. In this embodiment, the tank 10 is provided with an optically specular surface 16', which is acoustically deformable. As in the system of FIG. 3, a pulsed laser 20 provides the optical illumination for the system. A beam splitter 22 is positioned in the path of the laser to provide an illuminating beam 40 and a reference beam 42. The illuminating beam 40 is, in this embodiment, directed to a movable mirror 30' adapted to translate by approximately ⅛ of an optical wave length upon the application of an appropriate electrical pulse to provide a $\lambda/4$ phase shift.

The illuminating beam 40 is directed to a diverging lens 26' and from there to a converging lens 44. The beam converges upon the specular surface 16' and from there to a photographic film 46. The area of the film 46 is small relative to the acoustically deformable surface 16'.

The reference beam 42 is applied to an appropriate optical system to otherwise equalize the path lengths. The reference beam 42 is then applied to a mirror 28' and then to a diverging lens 36' which directs the reference beam 42 to the photographic film 46. A similar control circuit 39 is coupled to pulse the laser 20 and the motor element 32'.

It will be noted in this embodiment, that the available light is concentrated to a much smaller photographic film, reducing the size of the image. In such an embodiment, as in other embodiments, "motion picture" acoustical holography can be undertaken since the film can be "advanced", frame-by-frame after each double exposure convering one-half an acoustical cycle.

As yet a second alternative embodiment, in FIG. 5 there is shown a system in which the photographic emulsion 60 is supported by a backing material 62 which is acoustically deformable by the liquid. The acoustically transparent medium surrounding the object may have the illuminating acoustic beam applied to one surface and the emulsion can be applied to the opposite surface.

In this embodiment, a reference beam 64 is brought in at an angle to the surface of the film 60, and the illuminating object beam 66 is brought in perpendicular to the surface of the film. As in the other embodiments, one of either the reference or illuminating beams 64 and 66 is shifted by one-quarter optical wave length between successive exposures, which are separated in time by one-half of an acoustical wave cycle.

The developed photographic plate of this embodiment may be considered as a pair of optical gratings, superimposed upon each other and shifted by one-fourth of a "fringe". The acoustic displacement, if any, is then recorded as a Moire effect, as between the two gratings.

Turning next to FIG. 6, there is shown a system which enables the use of continuous wave laser 120, rather than the pulsed laser of the other embodiments. To maintain the benefit of using only a single sonic source, some method must be devised for "scanning" the acoustically deformed surface, so that any incremental portion of the image is recorded" in a very brief interval even though the entire exposure may require a substantial period of time.

A system akin to a "focal plane shutter" has been devised, which "sweeps" the acoustically deformable surface with a "line" of optical illumination. As an incidental benefit of this method, the "reconstructing wave" necessary to reconstruct the acoustical hologram, (related to the reference wave in a conventional hologram) is off-axis as a result of the recording process.

The overall systems of FIGS. 3 or 4 may be employed to record the optical interferometric hologram. However, the illuminating beam must be modified so that the surface 116 is scanned, rather than completely illuminated. Accordingly, neither the complete optical system for producing the reference beam nor the photographic film upon which the image is recorded is shown.

To provide the pair of scanning beams, a beam splitter 122 divides the laser beam into a first or leading scanning beam 124 which is reflected from a first mirror 128 to a first spherical lens 130. The beam is then focused upon a first spatial filter aperture 132. The beam then is applied to a cylindrical lens 134, which is movable in the vertical direction as shown. The beam 124 focuses as a line at the acoustical detection surface 116.

The lagging beam 126 is applied through a fixed mirror 136, and an adjustable mirror 138, which provides the quarter wave length wave shift difference as between the leading and lagging scanning beams. The lagging beam 126 is applied to a second spherical lens 140, which focuses the beam upon a second spatial filter aperture 142.

The lagging beam 126 is then applied to the cylindrical lens 134, and is brought to focus at the acoustic detention surface 116 in a second, lagging line which, at the normal scanning rate, illuminates a given point on the surface 116, onehalf of an acoustical cycle later than the leading line has illuminated that point.

The speed of the scan functions as the "reconstructing beam" (equivalent of the acoustical reference beam). If the sweep speed "V" is infinite, then the whole lane is illuminated simultaneously, which is equivalent to the pulsed system described above in connection with FIGS. 3 and 4. In this case, the angle $\theta$ of "incidence" of the "reconstructing beam" (the equivalent acoustic reference beam) is 0° and the beam is directed perpendicularly to the acoustical plane.

When the sweep speed "V" is equal to the speed of sound in the medium, "a", the angle $\theta = 90°$ and the "reconstructing beam" (the equivalent acoustical reference beam) is substantially parallel to the acoustical detection surface, barely grazing the surface.

The relationships as among the angle "$\theta$", the scanning or sweep speed "V" and the speed of sound in the medium "a" is given by the following equation.
$$\sin \theta = a/V$$
Since an off-axis reference beam is deemed desirable in holography, an angle of $\theta$ approximately $\theta \approx 80°$ would then require that the scanning or sweep speed V = 1.015 a.

The preceding embodiments have described methods related to double exposure, interferometric holography. These methods are now extended to include time-averaged, interferometric holography.

There are two types of conventional prior art forms of time-averaged interferometric holography. These are first Powell-Stetson time-averaged holography where a hologram is recorded of an object while it is vibrating, and second, real-time holography where a single hologram is made of the stationary object and the object is then viewed through the developed, single hologram as the object is allowed to vibrate. In both forms of time-averaged holography, the brightness of the image is a zero order Bessel function related to the amplitude of the vibration, but which is independent of the phase of the vibration. If the amplitude of motion of the vibrating surface or any other moving object is less than 10% of the length of the illuminating light, it has been found that the magnitude of displacement is directly proportional to the relative brightness of the image.

By introducing a phase modulation of predetermined magnitude at the frequency of object vibration impressed either upon the optical reference beam or the optical illuminating beam the brightness of the image becomes a zero order Bessel function wich includes a contribution from a phase term. In the preferred embodiment, the magnitude of the phase modulation is $4\pi$ 0.09 radians = 1.135 radians, which is equivalent to 65°.

The effect of phase modulation of this magnitude is equivalent to a change in the optical path length that would be provided by motion of the object "backwards" and "forwards" at the vibration frequency, with an amplitude determined by the magnitude of the phase modulation. Those portions vibrating in phase with the beam will appear to have a larger amplitude, those out of phase will appear to have a smaller amplitude and those that are 90° out of phase appear to be stationary.

This phenomena can be employed either in making a Powell-Stetson type time-averaged interferometric hologram or in the related real-time process of making a conventional hologram of a stationary object and then superimposing a reconstructed image upon the object when undergoing vibration for visual observation. In both aaplications, one of the optical beams is phase modulated at the vibration frequency. In the modification of the Powell-Stetson process, the time averaged hologram of the vibrating object is made using an object beam and a reference beam, but one of the two has imposed upon it, a phase modulation of predetermined magnitude, in the preferred embodiment 65°, at the frequency of vibration of the object at the predetermined frequency.

Those portions of the object that are in phase with the modulation will have the amplitude of the motion enhanced while those portions that are out of phase by 90° will appear to be at rest while the remaining areas will appear to have amplitudes that are proportional to the phase.

Alternatively, this method may be utilized to detect changes in phase of light traversing a transparent medium under periodic stress, rather than for the observation of a displaced surface. Changes in phase can be equated to changes in the length of the optical path, so that phase shifts, caused by propagation through a medium, can be measured directly.

Turning next to FIG. 7, which includes FIG. 7a and 7b, there is shown a vibrating member in FIG. 7a and, in FIG. 7b, the associated graph of brightness with respect to vibration amplitude when using the time-averaged interferometric hologram recording method of Powell and Stetson. As can be noted from the graph, assuming a maximum at the origin, there is a dark point and then a series of lesser maxima of brightness.

As seen in FIG. 8, when the phase modulation is introduced into one of the beams when viewing the object through the hologram in real-time, the minimum value of brightness now becomes one-half the maximum and the image still exhibits a series of lesser maxima, but the image never becomes completely dark.

In FIG. 9, there is shown a diagram of a system for making an improved Powell-Stetson time averaged interferometric hologram which utilizes a laser 220 which applies its output to a beam splitter 222 dividing the laser beam into an illuminating beam 223 and a reference beam 227. This embodiment, the reference beam 227 is phase modulated by an appropriate mechanism such as a mirror 230 mounted upon a piezo electric motor 232 which is driven by an oscillator 233 operating at the frequency of the vibrating object. The oscillator 233 and laser 220 are controlled by a control circuit 239.

The remainder of the system would be similar to that set forth in FIG. 3 with the illuminating beam 223 being directed to a vibrating object 216 while the reference beam 227 is directed to the photographic plate 238. The film is exposed over several vibration cycles of the object 216 and can later be developed. It must be understood that for the improvement to be of material benefit, the amplitude of vibration 216 should be less than $0.1\lambda$ under which circumstances this system exhibits substantial advantages over the conventional Powell-Stetson method.

These advantages are first, that the recording is a function of the phase as well as the amplitude of the object vibration and second that the function is recorded linearly instead of as a Bessel function. The function is linear because of restricting the object vibration to less than $0.1\lambda$ the method works on the straight (linear) part of the Bessel Function curve between the first maxima and minima, as shown in FIG. 7. The developed interferogram can then be used to reconstruct an image wherein the brightness is directly related to the amplitude and phase of the vibration.

Turning next to FIG. 10, there is shown a set up for the wave front reconstruction of an object from a hologram taken from the object while stationary and whose reconstructed image is to be superimposed over the object under vibration or other periodic motion and viewed by an observer. In this instance a conventional single exposure hologram is made of the stationary object. A laser 320 applies its beam to a beam splitter 322 which divides the beam into an illuminating beam 323 and a reference beam 327.

While the system is symmetrical and the roles of the illuminating and reference beams can be interchanged, for uniformity, the system is shown with the phase modulation being applied to the reference beam. Accordingly, the reference beam 327 is applied to a mirror 330 which is mounted upon a piezo electric motor 332 which is driven by an oscillator 333 operating at the frequency of object vibration. The oscillator 333 and laser 320 are controlled by a control circuit 339.

The modulated reference beam 327 is applied to a second mirror 334 and is directed to illuminate the developed hologram 338 so that the reconstructed image of the stationary object 316' is superimposed on the vibrating object 316. At the same time, the illuminating beam 323 is applied to the vibrating object 316 so that the wavefronts reflected from the object 316 are superimposed on the phase modulated image of the stationary object 316' and interference between the two wavefronts occurs.

The object 316 is then vibrated at a frequency $\omega_o$ and the reference beam 327 is phase modulated by the action of the oscillator 333 which also operates at a frequency $\omega_o$. The oscillator 333 phase modulates the beam 327 with a phase difference whose maximum is 65° in the preferred embodiment.

The combination of the phase modulated reference beam 327 illuminating the object 316 in vibration and the reconstructed image 316' of the object when stationary provides, to the observer, variations in brightness of the object, in which the excursions from some average level of brightness are directly proportional to object displacement.

According to the present invention, the phase modulation of a one of the reference and illuminating beams provides advantages both in the production of sonoholograms and in interferometric holography, generally. In the making of sonoholograms, the technique is specifically adapted to providing a hologram which represents a reasonably instantaneous "picture" of an acoustically deformable surface which exhibits the characteristic sound wave pattern produced by illumating an object with sound waves. Making a hologram of the surface results in a sonohologram of the object which can then be reconstructed.

In providing stop-action or instantaneous holograms of an acoustically deformed surface which is an instantaneous sonohologram of an object illuminated by sonic radiation only, the "focal plane" embodiment enabled the simulation of a "reference" sonic beam by the choice of sweep velocities of the illuminating laser radiation.

However, viewing the broader aspects of the present invention, the introduction of a phase change which is related to the sonic frequency can also be adapted to both Powell-Stetson time-averaged interferometric holography and to "real-time" interferometric holography as well. In the adaptation of the Powell-Stetson method, the hologram is made of a vibrating object by introducing a phase modulation at the vibration frequency into either the reference or the illuminating beam of the laser. In the Powell-Stestson case, the hologram is made of the vibrating object and in the "real-time interferometric" application, the hologram is created using the conventional methods but the vibrating object is viewed with the reconstructed image superimposed over it and with one of the laser beams being phase modulated at the vibration frequency.

While the applications of the present invention which produce "stop action" or "instantaneous hologram" are not affected by the amplitude of vibration of the object, the principal advantages of the other embodiment may not be realized if the magnitude of displacement of the vibrating object exceeds certain predetermined amounts which are related to the wave length of the illuminating radiation. In the preferred embodiments, the displacement magnitudes should be less than $0.1\lambda$, where $\lambda$ is the wave length of the laser radiation. In the time averaged interferometric holography case, this is consistent with the selection of approximately 65° as the magnitude of the phase modulation, since a 65° phase difference represents a change in optical path of approximately $0.18\lambda$ which is approximately twice the preferred amplitude. (In the double exposure method described in the first part of this disclosure the preferred phase change is 90°). When considering normal oscillatory motion, it will be seen that a total excursion of $0.18\lambda$ about a central point represents a positive excursion of approximately $0.1\lambda$ and a similar negative excursion.

In other alternative embodiments, the changes in phase might be introduced by anomolies in the propagation of one of the beams through a medium which would be equivalent to a changing of the path length. Such embodiments could be employed for the analysis and non-destructive investigation of "transparent"

media under periodic stress. Illumination here could be acoustical or microwave rather than in the visible frequencies.

As pointed out in Applied Physics Letter, Vol. 13, No. 10, pages 340, 341, referred to above and with reference to FIGS. 11 and 12 hereof, temporal reference holography, in its broadest aspects, require an appreciation of the need for "linear detection" of the instantaneous waveform of the illuminating radiation. At the present time, linear detection of optical radiation has not been deemed feasible. Accordingly, all forms of holography—optical, acoustical, and microwave—have involved recording the time-averaged intensity over many cycles of the object wave and a real or electronically simulated coherent reference wave, as shown in FIG. 11. Although this is unavoidable because of square-law detection in optical holography, a nontime-averaged acoustical or microwave hologram can be made which obviates the need for a real or electronically simulated reference wave.

If an object wave potential is recorded instantaneously within a cycle at each point on the hologram plane, the amplitude and phase is recorded with respect to the time of measurement at each point instead of with respect to another "reference" wave—hence the name "temporal reference." The effect of a reference wave of any shape is achieved by appropriately choosing the time to record the object wave potential instantaneously within the cycle at each point on the hologram plane, as in FIG. 11.

The wave, of $\omega$ radians per second frequency, which is radiated from an object in $x, y, z$ coordinate space, is written $$U_1(x,y,z) = A_1(x,y,z)e^{i[\omega t + \Psi_1(x,y,z)]} \quad (9)$$

where $A_1$ and $\Psi_1$ are, respectively, the amplitude and the phase of the wave.

A linear detector in the detection plane $H(x_h, y_h, z_h)$ records the instantaneous value of $U_1$ at time $t_h$, which is, from Equation (9), $A_1 \cos(\omega t_h + \Psi_1)$. In general, time $t_h$ is not the same for every point on the hologram but is a function of $x_h, y_h, z_h$. To achieve the effect of a reference wave $$U_o = A_o e^{i(\omega t + \Psi_0)} \quad (10)$$

where $A_o$ is a constant, the phase $\Psi_o$ is defined as $\Psi_o = -\omega t_h$ (11)

Then the time-independent function to be recorded is
$$Re[U_1] = A_1 \cos(\Psi_1 - \Psi_o) \quad (12)$$

When this function is biased by a constant value B (so as always to yield positive values) and the result is recorded on a photographic plate (whose coordinates correspond to the recording plane coordinates and whose $\Gamma = 1$), the photographic plate becomes a temporal reference hologram.

To reconstruct the hologram, the plate is illuminated with a real wave $U_o$. The wave transmitted by the developed photographic plate is proportional to
$$U_s = A_o e^{i(\omega t + \Psi_0)}[B + A\cos(\Psi_1 - \Psi_o)] \quad (13)$$
The $\omega t$ term may now be dropped from the equations:

$$U_s = \frac{1}{2}A_o e^{i\Psi_0}\left[2B + A_1 e^{i\Psi_1 - \Psi_0} + A_1 e^{-i\Psi_1 + \Psi_0}\right] \quad (14)$$

$$U_s = (2A_o)^{-1}\left[2BA_oU_o + U_1U_oU_o^* + U_1^*U_o^2\right] \quad (15)$$

Apart from the constant multiplicative factor outside the brackets, the first term is essentially the illuminating wave (i.e., the zero-order wave) passing through the hologram. The second term is the reconstructed object wave $U_1$ factored by the intensity $U_oU_o$ of the illuminating wave. The third term is the complex conjugate object wave of the same amplitude as the reconstructed object wave. Notice that the fourth term, which is present in the conventional holography equations and which requires that the reference amplitude be much larger than the object wave amplitude, is absent from Equation (15).

If the hologram is reconstructed with a wave $U_o'$ of a different wavelength from that of $U_o$, the reconstructed image will be subjected to the same magnification and distortions as occur when a conventional hologram is reconstructed with a different wavelength.

For reconstruction, the reconstructing wave $U_o$ usually will be either plane or spherical, as determined by the phase $\Psi_o$. If the kind of illuminating wave to be used is known, the time of recording each point in the plane can be determined from Equation (11).

If the illuminating wave is a plane wave making an angle $\theta$ with the hologram plane, the phase $\Psi_o$ of the illuminating wave will be constant in one direction along the plane (in the y-direction, say) and will vary in the orthogonal ($x$) direction. If the velocity of the original object wave is $a$, the phase is
$$-\Psi_o = (\Psi x \sin\theta)/a = \Psi t_h \quad (16)$$
Thus, the velocity $v$ at which the recording line must move is given by
$$v = x/t_h = a/\sin\theta \quad (17)$$
If $v = a$, $\theta = 90°$. If $v = \infty$ (i.e., the entire recording is made at one instant) $\theta = 0°$.

To demonstrate the feasibility of temporal reference holography, a temporal reference acoustical hologram was recorded with a Sokolov ultrasonic camera system, as illustrated in FIG. 12.

The system is the standard ultrasonic camera system 410 except for the following modifications: First, the horizontal sweep generator 412 was modified so that the speed with which the spot scans the back of the piezoelectric crystal 414 could be varied. Second, the horizontal sweep was triggered by the RF generator 416 supplying the sound source. This trigger ensured that each successive scan would start at the same phase relative to the preceding scan. This trigger is not essential, since without it the horizontal sweep duration can be adjusted to be exactly an integer number of acoustic cycles. However, it was found that in practice the horizontal sweep is difficult to adjust with sufficient accuracy, and as a result the hologram fringes displayed on the CRT appeared to "walk" across the screen in the horizontal direction when the camera was free-running.

It will be appreciated that the "image" on the camera faceplate, which is in the detection plane, is ultimately transferred to recording plane, here to faceplate of the CRT which displays the image. Obviously, the CRT can be replaced by any other display or recording device which can be driven by the Sokolov camera.

For each point in the detection plane, there is a point in the recording plane that corresponds thereto so that a temporal reference hologram can be created at the recording plane from illuminating radiation impinging upon the detection plane.

I claim:

1. Apparatus operable with a substantially monochromatic coherent radiation source for producing interference patterns at a predetermined location, comprising the combination of:

beam forming means for creating from the source an illuminating beam and a reference coherent therewith;

first means coupled to said beam forming means for directing said illuminating beam upon an object;

second means coupled to said beam forming means for directing said reference beam to the predetermined location;

phase shifting means interposed in the path of a one of said illuminating and reference beams for changing the phase thereof with respect to the other of said beams;

control means connected to said beam forming means and said phase shifting means for providing a first irradiation and a second irradiation subsequent to said first irradiation superimposed over and coextensive with said first irradiation, said phase shifting means introducing a relative change in phase as between said illuminating and reference beams in a second irradiation, said phase shifting means being operable to introduce up to a $\lambda/2$ shift, where $\lambda$ is the wavelength of the radiation source, for producing first and second superimposed radiation patterns at the predetermined location.

2. Apparatus of claim 1 wherein said phase shifting means is operable to introduce a $\lambda/4$ shift, where $\lambda$ is the wave length of the radiation source.

3. Apparatus of claim 2 wherein the object being illuminated by said first means is in oscillating motion at a frequency $\omega$, and wherein said second irradiation follows said first irradiation by a time interval equal to $1/2\omega$.

4. Apparatus of claim 3 wherein said control means includes means for controllably energizing the radiation source to produce said first and second irradiation.

5. Apparatus of claim 3 wherein said first means include third means for forming a leading scanning beam, fourth means for forming a lagging scanning beam, said control means include fifth means for applying said leading scanning beam as said first irradiation and said lagging scanning beam as second irradiation, and wherein said phase shifting means is interposed in the path of said lagging scanning beam.

6. Apparatus operable with a substantially monochromatic coherent radiation source for producing interference patterns at a predetermined location, comprising the combination of:

beam forming means for creating from the source an illuminating beam and a reference beam coherent therewith;

first means coupled to said beam forming means for directing said illuminating beam upon an object;

second means coupled to said beam forming means for directing said reference beam to the predetermined location;

phase shifting means interposed in the path of a one of said illuminating and reference beams for changing the phase thereof with respect to the other of said beams;

control means connected to said beam forming means and said phase shifting means for providing a first irradiation and a second irradiation subsequent to said first irradiation, said phase shifting means introducing a relative change in phase as between said illuminating and reference beams in said second irradiation, said phase shifting means being operable to introduce a phase shift $\phi$ that is less than $\lambda/4$ where $\lambda$ is the wave length of the radiation source.

7. Apparatus of claim 6 wherein the object being illuminated by said first means is in oscillatory motion at a frequency $\omega$ and said phase shifting means is operable to modulate the phase shift $\phi$ on a one of said illuminating and reference beams at the frequency $\omega$.

8. Apparatus of claim 7 wherein said phase shifting means modulate said reference beam.

9. Apparatus of claim 7 wherein the amplitude of object oscillation is less than $\lambda/4$.

10. Apparatus of claim 7 wherein the phase shift is approximately 65° and the amplitude of object oscillation is less than $0.1\lambda$.

11. Apparatus of claim 7 wherein a hologram of the object is placed at the predetermined location, whereby said reference beam reconstructs an image of the object superimposed upon the real object.

12. Apparatus of claim 7 wherein an unexposed photographic plate is placed at the predetermined location to record a time averaged interferogram of the object.

13. The apparatus of claim 12 wherein the phase shift $\phi$ is approximately 65° and the amplitude of object oscillation is less than $0.1\lambda$.

14. In an apparatus for creating a hologram of a surface adapted to vibrate at a predetermined frequency including first means having a coherent radiation source for illuminating the surface with a first coherent object beam;

a radiation sensitive surface positioned to receive the reflection of said object beam from the surface;

and second means for illuminating the radiation sensitive surface with a second reference beam coherent with the first beam, the improvement comprising:

modulating means coupled to a one of the first and second coherent beams for introducing a phase difference $\phi$ where $180° > \phi > 0°$, as between the first and second beams, at a frequency rate equal to the predetermined frequency, whereby the periodic phase change effectively changes the optical path length as between the source and the surface, equivalent to a periodic oscillatory motion of the surface at a predetermined frequency, and at an amplitude equal to $\phi\lambda/360°$, where $\lambda$ is the wave length of the illuminating radiation.

15. Apparatus as in claim 14, above, wherein said modulating means include means for providing a first illuminating interval with a relative phase difference $\phi = 0°$ and a second illuminating interval with a relative phase difference $\phi = 90°$.

16. Apparatus as in claim 15 above wherein said second illuminating interval follows said first illuminating interval by $n/2$ cycles at the predetermined frequency, where "$n$" is an odd integer.

17. Apparatus as in claim 14 wherein said modulating means include a mirror interposed in the path of one of said first and second beams and motor means moving said mirror whereby the length of the optical path can be modified by movement of said mirror.

18. Apparatus as in claim 14 further including a first diverging lens in the radiation path between the surface and the first means and a second diverging lens in the radiation path between the radiation sensitive surface and the second means.

19. Apparatus as in claim 18 further including a converging lens interposed in the radiation path between the surface and said first diverging lens.

20. Apparatus for producing an acoustic hologram of an ensonified object in a medium having a surface subject to distortion by impinging sonic radiation, the combination comprising:

illuminating means for applying a first coherent, monochromatic radiation beam to the medium surface;

reference means for applying a reference monochromatic radiation beam coherent with said first radiation beam and at the frequency thereof to the medium surface; and optical path shifting means for differing the path length of said first and second beams by $n\lambda/4$ where "$n$" is an odd integer and $\lambda$ is the wavelength of said radiation beams, whereby a radiation sensitive surface interposed in the path of said radiation beams reflected from the medium surface records a composite hologram of superimposed beams ultimately capable of reconstructing an optical image of the ensonified object, and means for superimposing an image on the radiation sensitive surface over a prior image to produce a hologram, including means to actuate said path shifting means for the later image.

21. Apparatus of claim 20, including interrupting means for limiting the time duration of said first and second beams to an interval substantially less than one sonic radiation cycle.

22. Apparatus as in claim 21, above, further including control means coupled to said interrupting means for providing a first illumination interval, and a second illumination interval, following said first interval by a period of time equal to $n/2$ sonic radiation cycles where $n$ is an odd integer.

23. Apparatus as in claim 22 above, wherein said illuminating means apply said first radiation beam simultaneously to the entire surface during each illumination interval, each illumination interval is less than ¼ sonic cycle and wherein said optical path shifting means is coupled to said control means for providing a path length difference of $n\lambda/4$ only during second illumination intervals.

24. Apparatus as in claim 22 above wherein said control means provide a leading narrow scanning beam corresponding to said first interval and a lagging narrow scanning beam corresponding to said second interval and said control means including scanning means for sweeping the surface with said leading and lagging beams at a predetermined velocity, said leading and lagging beams being separated by a distance equal to $n/2$ sonic waves.

25. Apparatus as in claim 24 wherein said control means include a leading diverging lens, a leading aperture at the focus thereof, a lagging diverging lens and a lagging aperture at the focus thereof, and a common diverging lens in the path of said leading and lagging beams, said common lens being translatable in a path parallel to the surface for scanning the surface with said beams.

26. Apparatus for producing a hologram of an object illuminated by coherent, monochromatic radiation of frequency $\omega$, comprising:

first means for linearly detecting at a first, detection plane the phase and amplitude of radiation scattered from the object and for generating signals representative of the radiation at each point in the plane and second means coupled to said first means for transmitting each of said signals substantially instantaneously, a recording plane, each point of which corresponds to a point in said detection plane and responsive to said second means, and for recording, at said recording plane, the substantially instantaneous value "$a$" of detected radiation amplitude at the detection plane at a predetermined time, $t$, where $a = A \cos(\omega t + \phi)$, $A$ is the maximum amplitude of radiation and $\phi$ is the phase of the radiant wave with respect to $t$.

27. Apparatus as in claim 26 above, further including third means coupled to said first and second means for adding a signal corresponding to a constant increment of amplitude to said signal representing the detected radiation to insure relatively positive values of signals representing amplitude.

28. Apparatus as in claim 26 above, wherein said first and second means include means for simultaneously detecting and recording radiation amplitude values over the entire detection plane.

29. Apparatus as in claim 26 above, wherein said first and second means include means for sequentially detecting and recording instantaneous amplitude values for each incremental area of the plurality of incremental areas comprising the detector and recording planes.

30. In an apparatus for creating a hologram of a surface adapted to vibrate at a predetermined frequency with an amplitude less than $\lambda$, where $\lambda$ is the wave length of an applied illuminating radiation, including first means having a coherent radiation source for illuminating the surface with a first coherent object beam; a radiation sensitive surface positioned to receive the reflection of said object beam from the surface; and second means for illuminating the radiation sensitive surface with a second reference beam coherent with the first beam, the improvement comprising:

modulating means coupled to a one of the first and second coherent beams for introducing a phase difference where $\phi + n/\lambda > 140°$ and $\phi\lambda/360° > n/\lambda$ as between the first and second beams, at a frequency rate equal to the predetermined frequency, whereby the periodic phase change effectively changes the optical path length as between the source and the surface, equivalent to a periodic oscillatory motion of the surface at the predetermined frequency, and at an amplitude equal to $\phi\lambda/360°$.

31. Apparatus for producing an acoustic hologram of an ensonified object in a medium having a surface subject to distortion at a maximum amplitude "$a$" less than $\lambda$, where $\lambda$ is the wave length of an applied radiation beam by impinging sonic radiation, the combination comprising:

illuminating means for applying a first coherent, monochromatic radiation beam to the medium surface;

reference means for applying a second, reference monochromatic radiation beam coherent with said first radiation beam and at the frequency thereof to a radiation sensitive surface;

and optical path shifting means for effectively differing the path length of said first and second beams by an amount $(n\lambda + d)$ where "$n$" is an integer, $\lambda > d > a$, and $(d+a) < 0.4\lambda$ to produce an interference pattern in which the first extinction point on the brightness curve is not reached by the combined real and apparent amplitude of vibration of any incremental area of the surface, whereby a radiation sensitive surface interposed in the path of said radiation beams reflected from the medium surface records hologram ultimately capable of reconstructing an optical image of the ensonified object.

32. A method utilizing a substantially monochromatic coherent radiation source for producing interference patterns at a predetermined location, comprising the steps of:
creating from the source an illuminating beam and a reference beam coherent therewith;
directing said illuminating beam upon an object;
directing said reference beam to the predetermined location;
providing a first irradiation and providing a second irradiation subsequent to said first irradiation superimposed over and coextensive with said first irradiation;
changing the phase of a one of said illuminating and reference beams with respect to the other of said beams by an amount up to $\phi/2$, where $\lambda$ is the wavelength of the radiation source; and introducing a relative change in phase as between said illuminating and reference beams in only one of said first and second irradiations.

33. The method of claim 32 wherein the step of phase shifting is operable to introduce a $\lambda/4$ shift, where $\lambda$ is the wave length of the radiation source.

34. The method of claim 33 wherein the object being illuminated is in oscillating motion at a frequency $\omega$, and wherein said second irradiation step follows said first irradiation step by a time interval equal to $1/2\omega$.

35. The method of claim 32 wherein said illuminating beam directing step includes forming a leading scanning beam, forming a lagging scanning beam;
said irradiation applying including the steps of applying said leading scanning beam as said first irradiation and applying said lagging scanning beam as said second irradiation; and wherein said changing step changes the phase of said lagging scanning beam.

36. A method utilizing a substantially monochromatic coherent radiation source for producing interference patterns at a predetermined location, comprising the steps of creating from the source an illuminating beam and a reference beam coherent therewith;
directing said illuminating beam upon an object;
directing said reference beam to the predetermined location;
providing a first irradiation and providing a second irradiation subsequent to said first irradiation;
changing the phase of a one of said illuminating and reference beams with respect to the other of said beams by an amount $\phi$ and introducing said relative change in phase as between said illuminating and reference beams in only one of said first and second irradiations, said phase changing step introducing a phase shift $\phi$ that is less than $\lambda/4$ where $\lambda$ is the wave length of the radiation source.

37. The method of claim 36 wherein the object being illuminated is in oscillatory motion at a frequency $\omega$, and said phase changing step modulates the phase shift $\phi$ on a one of said illuminating and reference beams at the frequency $\omega$.

38. The method of claim 37 wherein said phase changing step modulates said reference beam.

39. The method of claim 37 wherein the amplitude of object oscillation is less than $\lambda/4$.

40. The method of claim 37 wherein the phase change is approximately 65°, and the amplitude of object oscillation is less than 0.1 $\lambda$.

41. The method of claim 37 further including the step of placing a hologram of the object at the predetermined location, whereby said reference beam reconstructs an image of the object superimposed upon the real object.

42. The method of claim 37 further including the step of placing an unexposed photographic plate at the predetermined location to record a time averaged interferogram of the object.

43. The method of claim 42, wherein said introducing step includes the steps of providing a first illuminating interval with a relative phase difference $\phi = 0°$ and a second illuminating interval with a relative phase difference $\phi = 90°$.

44. In a method for creating a hologram of a surface adapted to vibrate at a predetermined frequency including the steps of illuminating the surface, with a first coherent object beam from a radiation source;
positioning a radiation sensitive surface to receive the reflection of said object beam from the surface;
illuminating the radiation sensitive surface with a second reference beam coherent with the first beam, the improvement comprising the step of introducing a phase difference $\phi$ where $180° > \phi > 0$, as between the first and second beams, at a frequency rate equal to the predetermined frequency, whereby the periodic phase change effectively changes the optical path length as between the source and the surface, equivalent to a periodic oscillatory motion of the surface at the predetermined frequency, and at an amplitude equal to $\phi\lambda/360°$, where $\lambda$ is the wave length of the illuminating radiation.

45. The method of claim 44, wherein said introducing step includes the steps of providing a first illuminating interval with a relative phase difference $\phi = 9°$ and a second illuminating interval with a relative phase difference $\phi = 90°$.

46. The method of claim 45 wherein said second illuminating interval follows said first illuminating interval by $n/2$ cycles at the predetermined frequency, where "$n$" is an odd integer.

47. The method of claim 44 wherein said introducing step includes the steps of interposing a mirror in the path of one of said first and second beams, and moving said mirror whereby the length of the optical path can be modified by movement of said mirror.

48. The method of claim 44 further including the steps of interposing a first diverging lens in the radiation path between the surface and the source of the first object beam and interposing a second diverging lens in the radiation path between the radiation sensitive surface and the source of the second reference beam.

49. The method of claim 48 further including the step of interposing a converging lens in the radiation path between the surface and said first diverging lens.

50. A method for producing an acoustic hologram of an ensonified object in a medium having a surface subject to distortion by impinging sonic radiation, using only a sonic object beam without a sonic reference beam, comprising the steps of:
applying a first coherent, monochromatic radiation beam to the medium surface which is being linearly distorted by impinging sonic radiation;

applying a reference monochromatic radiation beam coherent with said first radiation beam and at the frequency thereof to the medium surface; differing the path length of said first and second beams by $n\lambda/4$ where "$n$" is an odd integer and $\lambda$ is the wavelength of said radiation beams in a second exposure, and interposing a recording medium in the path of the reflected beams for successively recording superimposed reflected beams, thereby creating a hologram ultimately capable of reconstructing an optical image of the ensonified object.

51. The method of claim 50, further including the step of limiting the time duration of said first and second beams to an interval substantially less than one sonic radiation cycle.

52. The method of claim 51, further including the step of providing a first illumination interval, and a second illumination interval, following said first interval by a period of time equal to $n/2$ sonic radiation cycles, where "$n$" is an odd integer.

53. The method of claim 52, wherein said applying step applies said first radiation beam simultaneously to the entire surface during each illumination interval, each illumination interval being less than ¼ sonic cycle, and wherein said path differing step provides a path length difference of $n\lambda/4$ only during second illumination intervals.

54. The method of claim 52, wherein said applying step applies a leading narrow scanning beam corresponding to said first interval and a lagging narrow scanning beam corresponding to said second interval, and further includes the steps of sweeping the surface with said leading and lagging beams at a predetermined velocity, said leading and lagging beams being separated by a distance equal to $n/2$ sonic waves.

55. The method of producing a hologram of an object illuminated by coherent, monochromatic radiation of frequency $\omega$, comprising the steps of:
linearly detecting at a detection plane the phase and amplitude of radiation scattered from the object and generating signals representative of the radiation at each point in the plane and transmitting each of said signals substantially instantaneously and recording said transmitted signals at a recording plane having a point for point correspondence to the detection plane, the substantially instantaneous value "$a$" of detected phase and amplitude at the detection plane at a predetermined time, $t$, where
$a = A \cos(\omega t + \phi)$,
$A$ is the maximum amplitude of radiation and
$\phi$ is the phase of the radiant wave with respect to $t$.

56. The method of claim 55, further including the step of adding a constant increment of amplitude to the detected radiation amplitude to insure relatively positive values of amplitude.

57. The method of claim 55, further including the step of simultaneously detecting and recording amplitude values over the entire detection plane.

58. The method of claim 55, wherein the detecting and recording steps sequentially detect and record instantaneous amplitude values for each incremental area of the plurality of incremental areas comprising the detector and recording planes.

59. In a method for creating a hologram of a surface adapted to vibrate with an amplitude less than $\lambda$, where $\lambda$ is the wave length of an applied illuminating radiation, at a predetermined frequency including the steps of illuminating the surface, with a first coherent object beam from a radiation source;
positioning a radiation sensitive surface to receive the reflection of said object beam from the surface; illuminating the radiation sensitive surface with a second reference beam coherent with the first beam, the improvement comprising the step of introducing a phase difference $\phi$ where "$n$" in an integer,
$\phi + n/\lambda < 140°$
and $\phi\lambda/360° > n/\lambda$
as between the first and second beams, at a frequency rate equal to the predetermined frequency, whereby the periodic phase change effectively changes the optical path length as between the source and the surface, equivalent to a periodic oscillatory motion of the surface at the predetermined frequency, and at an amplitude equal to $\phi\lambda/360°$.

60. A method for producing an acoustic hologram of an ensonified object in a medium having a surface subject to distortion at a maximum amplitude "$a$" less than $\lambda$, where $\lambda$ is the wave length of applied illuminating radiation beam by impinging sonic radiation, comprising the steps of:
applying a first coherent, monochromatic radiation beam of wavelength $\lambda$ to the medium surface;
applying a second, reference monochromatic radiation beam of wavelength $\lambda$ coherent with said first radiation beam to the medium surface; differing the path length of said first and second beams by an amount $(n\lambda + d)$ where "$n$" is an integer, $\lambda > d > a$, and $(d+a) < 0.4\lambda$, and interposing a recording medium in the path of the reflected beams thereby creating a hologram ultimately capable of reconstructing an optical image of the ensonified object.

* * * * *